3,384,113
RELIEF VALVE
Joseph M. Pennisi, West Lafayette, Ind., assignor to General Dynamics Corporation, a corporation of Delaware
Filed Nov. 3, 1965, Ser. No. 506,180
3 Claims. (Cl. 137—525)

ABSTRACT OF THE DISCLOSURE

A relief valve assembly of the unidirectional flow type comprising a generally tubular-shaped body member having laterally directed vent openings in the wall at one end thereof, a cylindrically shaped rubber boot member which sealingly fits around the body member outer wall so as to cover the vent opening portions, and means for securing the boot member to the body member. In operation, a given fluid pressure which exists in the valve chamber will act against the rubber boot to cause expansion thereof, and consequently a vent passage between the boot and the body member will be formed.

---

This invention relates to relief valves and more particularly to relief valves utilizing a flexible member wherein the flexing of the member in response to pressure operates the valve.

The ordinary check or relief valves, such as the flap, poppet or ball type, whether biased with a spring or not, will stick causing reduced and inaccurate delivery of fluid or remain closed preventing delivery. Such valves frequently trap air or gas which may expand or contract, thereby affecting the quantity of liquid that is supposed to pass therethrough in a given time. Foreign matter, in the form of solid substances, is also effective in upsetting the accurate operation of the valves.

In numerous instances, particularly in the hydraulic and pneumatic fields, the problem of venting certain areas within valves, lines, etc., exists. Various types of relief or check valves, as pointed out above, have been utilized to overcome this problem, and have, in many instances, been unsatisfactory.

The valve of this invention is extremely simple in construction yet will vent effectively and efficiently exclude foreign materials from entering the venting chamber.

Therefore, it is an object of this invention to provide a relief valve having sensitivity to vibrations.

A further object of the invention is to provide a valve having a flexible venting member.

Another object of the invention is to provide a low pressure relief valve which allows fluid flow in one direction and prevents flow in the opposite direction.

Another object of the invention is to provide a valve having a member of flexible material wherein the flexing of the member is in response to internal pressure thereon.

Other objects of the invention will become readily apparent from the following description and accompanying drawings wherein.

Figure 1:
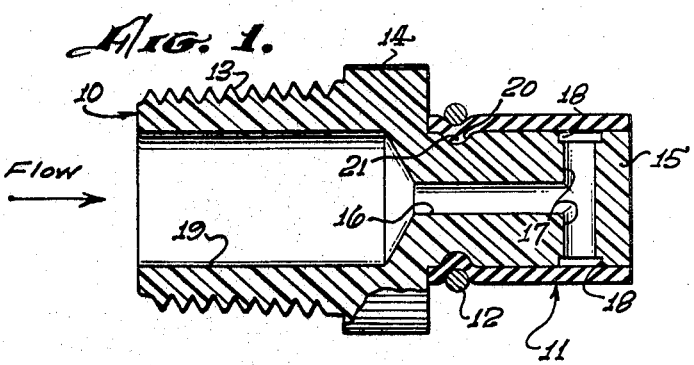
FIG. 1 is a cross-sectional view of an embodiment of the invention in the non-actuated or closed position.

Broadly, the invention, as illustrated, involves a relief valve assembly of the unidirectional flow type comprising a generally tubular-shaped body member having laterally directed vent openings in the wall at one end thereof, a cylindrically shaped rubber boot member which sealingly fits around the body member outer wall so as to cover the vent opening portions, and means for securing the boot member to the body member. In operation, a given fluid pressure which exists in the valve chamber will act against the rubber boot to cause expansion thereof, and consequently a vent passage between the boot and the body member will be formed.

Referring now to the drawings, the relief valve assembly of the illustrated embodiment comprises three parts, namely, a valve body or housing 10, an expandable cover or boot 11, and a clamp 12. The valve body 10 may be made of any suitable metal or molded from material such as nylon and comprises three portions 13, 14 and 15 of different diameter. Portion 13 of body 10 is threaded to mate with a desired fitting such as that of a pipe or tube. Portion 14 defines a knurled nut for inserting or removing the valve assembly. Portion 15 is of a diameter smaller than either of portions 13 and 14 and serves as the boot retainer portion and discharge member. Valve body 10 is provided with an internal bore or passage 16 which terminates within portion 15 thereof and serves as a fluid supply passageway for laterally directed vent openings 17 (only two being shown) in body portion 15. Vent openings 17 terminate in an annular groove 18 while internal bore 16 is countersunk at 19. Valve body portion 15 is provided with an annular groove 20 within which the material of boot 11 is forced by clamp 12, the boot 11 normally functioning to seal or close the vent openings 17. Clamp 12 may be, for example, of the standard hose type with a protective plating to retard corrosion. The expandable boot or cover 11 may be molded of silicon rubber or other suitable material to provide chemical inertness and a wide temperature range.

Figure 2:
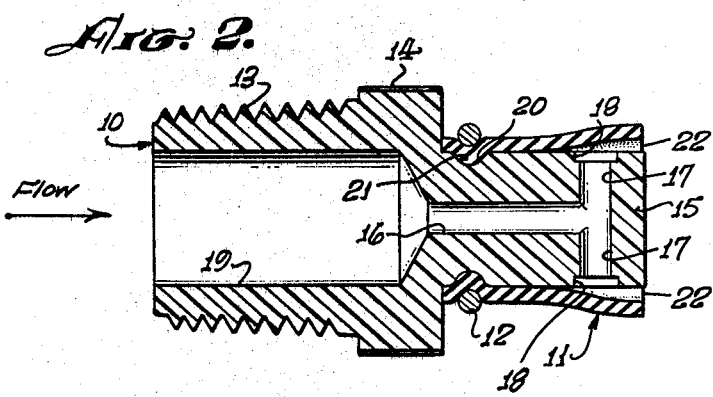
FIG. 2 is a view of the FIG. 1 device in the actuated or open position.

In operation, internal fluid pressure in bore 16, created by a force indicated by the legend "Flow," exerts via vent openings 17 and groove 18, a radial force on the boot 11. This force expands the boot 11 away from the valve body portion 15 and allows the pressurized fluid to bleed through opening 22 between the outer end of boot 11 and valve body 10 to the atmosphere as illustrated in FIG. 2. The cracking or opening pressure of the valve assembly is determined by the free diameter of the boot 11, the wall thickness of the boot, and the configuration of the body or housing 10.

It has been found that with the boot 11 constructed of certain material such as silicon rubber the clamp 12 may be omitted along with the cooperating groove 20, the boot providing a sufficient gripping action of the valve body portion 15 to be retained thereon during operation of the valve assembly. Also, if desired the boot 11 can be molded ot include an internal protruding member or lip 21 which fits into the groove 20 of the valve body portion 15 and thus serve as the boot retainer means.

It has thus been shown that this invention provides a relief valve assembly which is simple in construction yet effective and efficient in operation while being substantially free of disturbance from vibrations.

Although a particular embodiment of the invention has been illustrated and described, modifications will become apparent to those skilled in the art, and it is intended to cover in the appended claims all such modifications as come within the true spirit and scope of the inventon.

I claim:
1. A relief valve comprising: a body member; an expandable member; and means for retaining said expandable member on said body member; said body member having two end portions and a central portion of different diameters, one end portion being at least partially externally threaded, said central portion being larger in diameter than said one end portion and defining a knurled nut, the other end portion being smaller in diameter than said one end portion and defines a substantially smooth annular surface; said body member being pro- vided with an internal bore which extends through said one end portion, said central portion, and partially through said other end portion; said other end portion of said body member being provided with at least one laterally extending opening in communication with said internal bore; said other end portion of said body member being additionally provided with a first annular external groove in communication with said laterally extending opening; said other end portion of said body member also being provided with a second annular external groove located intermediate said first annular external groove and said central portion of said body member; said expandable member being positioned over said other end portion of said body member so as to normally cover said first annular external groove; said expandable member retaining means comprising a clamp means positioned around said expandable member and said second annular external groove of said other end portion of said body member, whereby internal fluid pressure through said internal bore, said laterally extending opening, and said first annular external groove exerts a radial force on said expandable member moving a portion of said expandable member away from said other end portion of said body member and allowing fluid to bleed between said members.

2. The relief valve defined in claim 1, wherein said expandable member is constructed of silicon rubber.

3. The relief valve defined in claim 1, wherein said body member is constructed of nylon.

References Cited

UNITED STATES PATENTS

| 316,644 | 4/1885 | Olson | 137—525.1 X |
| 2,385,513 | 9/1945 | Helvern et al. | 137—112 X |
| 2,715,980 | 8/1955 | Frick | 137—525 X |
| 3,111,271 | 11/1963 | Löfgren | 251—368 X |
| 3,132,836 | 5/1964 | Dickerson et al. | 251—368 X |
| 3,231,149 | 1/1966 | Yuza | 137—525 X |

FOREIGN PATENTS 545,676   9/1957   Canada.

WILLIAM F. O'DEA, *Primary Examiner.*

D. J. ZOBKIW, *Assistant Examiner.*